US009632947B2

(12) United States Patent
Avudaiyappan et al.

(10) Patent No.: US 9,632,947 B2
(45) Date of Patent: Apr. 25, 2017

(54) SYSTEMS AND METHODS FOR ACQUIRING DATA FOR LOADS AT DIFFERENT ACCESS TIMES FROM HIERARCHICAL SOURCES USING A LOAD QUEUE AS A TEMPORARY STORAGE BUFFER AND COMPLETING THE LOAD EARLY

(71) Applicant: Intel Corporation, Santa Clara, CA (US)

(72) Inventors: Karthikeyan Avudaiyappan, Sunnyvale, CA (US); Paul G. Chan, Oakland, CA (US)

(73) Assignee: Intel Corporation, Santa Clara, CA (US)

( * ) Notice: Subject to any disclaimer, the term of this patent is extended or adjusted under 35 U.S.C. 154(b) by 109 days.

(21) Appl. No.: 13/970,277

(22) Filed: Aug. 19, 2013

(65) Prior Publication Data
US 2015/0052303 A1  Feb. 19, 2015

(51) Int. Cl.
*G06F 12/00* (2006.01)
*G06F 13/00* (2006.01)
*G06F 13/28* (2006.01)
*G06F 12/0897* (2016.01)
*G06F 12/0855* (2016.01)

(52) U.S. Cl.
CPC ...... *G06F 12/0897* (2013.01); *G06F 12/0859* (2013.01)

(58) Field of Classification Search
CPC ............... G06F 12/0897; G06F 12/0859
USPC ........................................ 711/122
See application file for complete search history.

(56) References Cited

U.S. PATENT DOCUMENTS

| 4,847,758 | A |   | 7/1989 | Olson et al. |
|---|---|---|---|---|
| 4,858,111 | A |   | 8/1989 | Steps |
| 5,301,287 | A |   | 4/1994 | Herrell et al. |
| 5,513,344 | A |   | 4/1996 | Nakamura |
| 5,603,010 | A |   | 2/1997 | Dodd et al. |
| 5,767,856 | A | * | 6/1998 | Peterson ............ G06T 1/20 345/422 |
| 5,920,889 | A | * | 7/1999 | Petrick ............ G06F 12/0859 711/126 |
| 5,983,332 | A |   | 11/1999 | Watkins |
| 6,021,485 | A | * | 2/2000 | Feiste ............ G06F 9/3816 712/216 |
| 6,041,387 | A | * | 3/2000 | Fleck ............ G06F 9/30032 711/100 |
| 6,141,747 | A | * | 10/2000 | Witt ............ G06F 9/3826 711/138 |
| 6,215,497 | B1 |   | 4/2001 | Leung |
| 6,366,984 | B1 | * | 4/2002 | Carmean ............ G06F 12/0804 710/52 |

(Continued)

*Primary Examiner* — Sheng-Jen Tsai
(74) *Attorney, Agent, or Firm* — Nicholson, De Vos, Webster & Elliot, LLP

(57) ABSTRACT

A method for acquiring cache line data associated with a load from respective hierarchical cache data storage components. As a part of the method, a store queue is accessed for one or more portions of a cache line associated with a load, and, if the one or more portions of the cache line is held in the store queue, the one or more portions of the cache line is stored in a load queue location associated with the load. The load is completed if the one or more portions of the cache line stored in the load queue location includes all portions of the cache line associated with the load.

18 Claims, 5 Drawing Sheets

(56) References Cited

U.S. PATENT DOCUMENTS

| | | | |
|---|---|---|---|
| 6,401,192 B1* | 6/2002 | Schroter | G06F 9/383 711/137 |
| 6,457,075 B1 | 9/2002 | Koutsoures | |
| 6,505,277 B1* | 1/2003 | Arimilli | G06F 9/3824 711/119 |
| 6,553,473 B1* | 4/2003 | Gaskins | G06F 12/0859 711/123 |
| 6,868,491 B1* | 3/2005 | Moore | G06F 9/3017 712/216 |
| 7,177,985 B1* | 2/2007 | Diefendorff | G06F 12/0862 711/118 |
| 7,334,108 B1 | 2/2008 | Case et al. | |
| 7,343,477 B1 | 3/2008 | Thatipelli et al. | |
| 7,594,079 B2 | 9/2009 | Yu et al. | |
| 9,229,873 B2* | 1/2016 | Avudaiyappan | G06F 12/0895 |
| 2001/0013870 A1* | 8/2001 | Pentkovski | G06F 9/30043 345/557 |
| 2002/0169935 A1* | 11/2002 | Krick | G06F 12/0831 711/167 |
| 2003/0005226 A1 | 1/2003 | Hong | |
| 2003/0018875 A1* | 1/2003 | Henry | G06F 9/3834 711/203 |
| 2003/0056066 A1* | 3/2003 | Chaudhry | G06F 12/0855 711/154 |
| 2004/0199749 A1* | 10/2004 | Golla | G06F 9/30043 712/218 |
| 2006/0031641 A1 | 2/2006 | Hataida et al. | |
| 2006/0179284 A1* | 8/2006 | Jensen | G06F 9/30079 712/219 |
| 2007/0288725 A1* | 12/2007 | Luick | G06F 9/3828 712/225 |
| 2008/0082794 A1* | 4/2008 | Yu | G06F 9/3824 712/218 |
| 2009/0089510 A1 | 4/2009 | Lee et al. | |
| 2009/0150622 A1 | 6/2009 | Allen, Jr. et al. | |
| 2010/0011166 A1 | 1/2010 | Yu et al. | |
| 2010/0049952 A1* | 2/2010 | Eddy | G06F 9/3834 712/223 |
| 2011/0040955 A1* | 2/2011 | Hooker | G06F 9/30043 712/225 |
| 2011/0145513 A1 | 6/2011 | Iyer et al. | |
| 2012/0072667 A1* | 3/2012 | Anderson | G06F 12/0862 711/122 |
| 2013/0212585 A1* | 8/2013 | Tran | G06F 9/30189 718/102 |
| 2014/0006698 A1* | 1/2014 | Chappell | G06F 12/0842 711/105 |
| 2014/0013027 A1 | 1/2014 | Jannyavula Venkata et al. | |
| 2014/0032846 A1* | 1/2014 | Avudaiyappan | G06F 12/0895 711/122 |
| 2014/0032856 A1* | 1/2014 | Avudaiyappan | G06F 12/0815 711/143 |
| 2014/0095784 A1* | 4/2014 | Tran | G06F 12/1027 711/108 |
| 2014/0173343 A1* | 6/2014 | Ahmed | G06F 11/3648 714/30 |
| 2014/0205012 A1* | 7/2014 | Lee | H04N 19/42 375/240.16 |
| 2014/0215191 A1* | 7/2014 | Kanapathipillai | G06F 9/3834 712/220 |
| 2014/0317357 A1* | 10/2014 | Kaplan | G06F 12/0862 711/137 |
| 2015/0205605 A1* | 7/2015 | Abdallah | G06F 9/30043 711/145 |
| 2016/0041913 A1* | 2/2016 | Avudaiyappan | G06F 12/0895 711/128 |

* cited by examiner

SYSTEMS AND METHODS FOR ACQUIRING DATA FOR LOADS AT DIFFERENT ACCESS TIMES FROM HIERARCHICAL SOURCES USING A LOAD QUEUE AS A TEMPORARY STORAGE BUFFER AND COMPLETING THE LOAD EARLY

A cache in a central processing unit is a data storage structure that is used by the central processing unit of a computer to reduce the average time that it takes to access memory. It is a memory which stores copies of data that is located in the most frequently used main memory locations. Moreover, cache memory is memory that is smaller and that may be accessed more quickly than main memory. There are several different types of caches.

Conventional caches can include separate cache components that have a hierarchical relationship. For example, conventional cache systems can include level 1, level 2 and level 3 cache structures. In a shared memory system that includes separate cache memory components, it is possible to have many copies of data: one copy in the main memory and another copy in one or more cache memory components. However, the copies can be different.

Cache misses occur when a program accesses a memory location that is not in the cache. Some conventional processors treat an access of a copy of data that only includes some of the data that is useful to satisfy a load request as a miss. When a cache miss occurs, the processor has to wait for the data to be fetched from the next cache level or from main memory before it can continue to execute. Accordingly, cache misses can negatively impact the performance of the processor. In particular, such processors can exhibit an unsatisfactory latency that is attributable to the delay that is associated with fetching cache lines from a next cache level or main memory.

SUMMARY

Some conventional processors exhibit an unsatisfactory latency that is attributable to the waiting period that is associated with fetching data from a next level cache or main memory. A method for acquiring a cache line associated with a load from respective hierarchical cache data storage components is disclosed that addresses these shortcomings. However, the claimed embodiments are not limited to implementations that address any or all of the aforementioned shortcomings. As a part of the method, a store queue is accessed for one or more portions of a cache line associated with a load, and, if the one or more portions of the cache line is held in the store queue, the one or more portions of the cache line is stored in a load queue location associated with the load. The load is enabled to execute and complete if the one or more portions of the cache line stored in the load queue location includes all portions of the cache line associated with the load. If the store queue does not hold all of the portions of the cache line associated with the load, respective cache data storage components are additionally accessed, in succession, for one or more portions of the cache line associated with the load. If one or more portions of the cache line is held in one or more cache data storage components of the respective cache data storage components, the one or more portions of the cache line is stored in the load queue location associated with the load. The load is enabled to execute if the one or more cache data storage components of the respective cache data storage components provide the one or more portions of the cache line, for storage in the load queue location, and the provision of the one or more portions, completes an acquisition of all portions of the cache line that is associated with the load. Accordingly, in a processor with multiple hierarchies of caches and other sources of data for a load, data can be collected one or more bytes at a time from each source so that when data corresponding to a load is fully satisfied, the data can be returned to the instruction pipeline without having to wait for the entire cache line to be brought from either main memory or the next level of cache.

BRIEF DESCRIPTION OF THE DRAWINGS

The invention, together with further advantages thereof, may best be understood by reference to the following description taken in conjunction with the accompanying drawings in which.

It should be noted that like reference numbers refer to like elements in the figures.

DETAILED DESCRIPTION

Figure 1A:
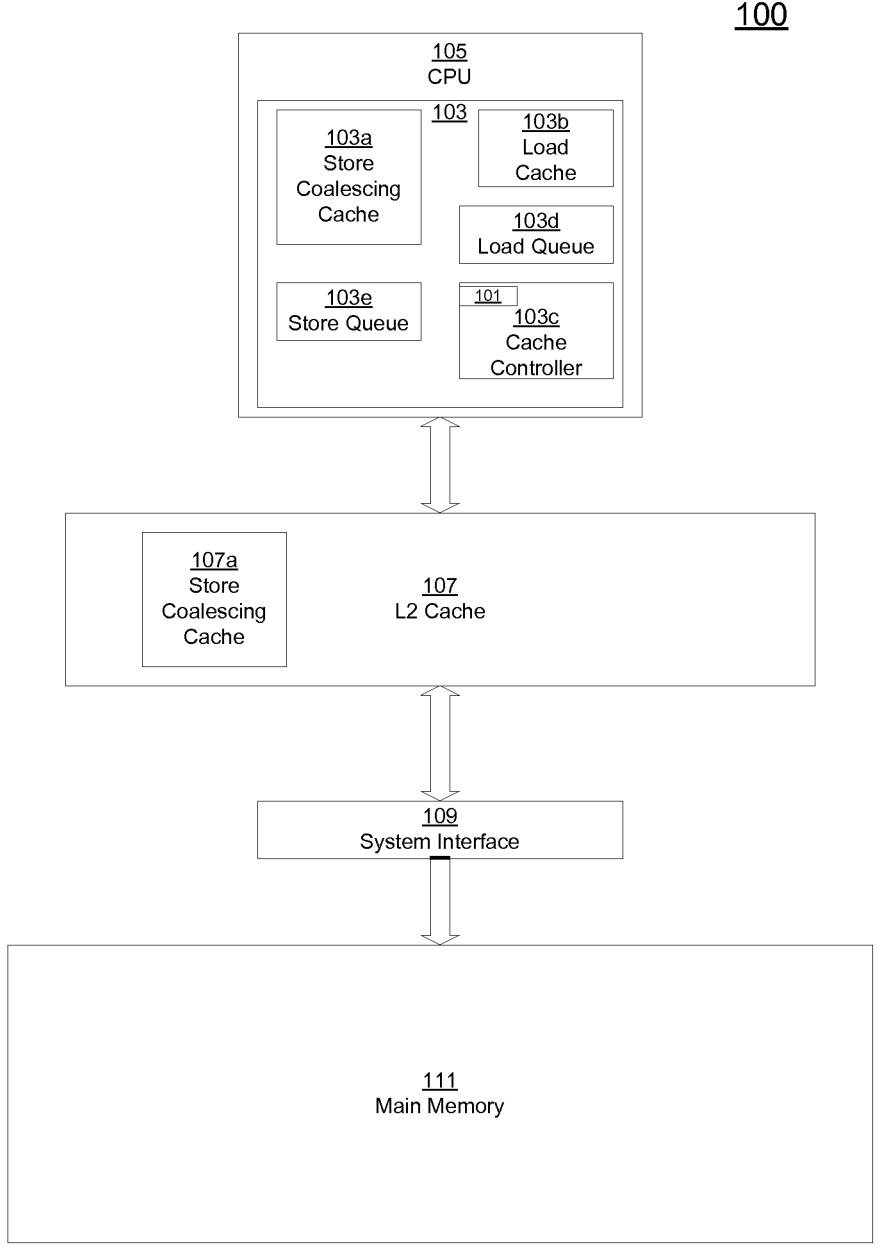
FIG. 1A shows an exemplary operating environment of a system for acquiring data from hierarchical sources and using a load queue as temporary storage buffer according to one embodiment.

Although, the present invention has been described in connection with one embodiment, the invention is not intended to be limited to the specific forms set forth herein. On the contrary, it is intended to cover such alternatives, modifications, and equivalents as can be reasonably included within the scope of the invention as defined by the appended claims.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals of a computer readable storage medium and are capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing" or "merging" or "storing" or the like, refer to the action and processes of a computer system, or similar electronic computing device that manipulates and transforms data represented as physical (electronic) quantities within the computer system's registers and memories and other computer readable media into other data similarly represented as physical quantities within the computer system memories or registers or other such information storage, transmission or display devices.

Exemplary Operating Environment of Systems and Methods for Acquiring Data for Loads at Different Access Times from Hierarchical Sources Using a Load Queue as a Temporary Storage Buffer and Completing the Load Early According to One Embodiment FIG. 1A shows an exemplary operating environment 100 of a system 101 for acquiring data for loads at different times from hierarchical sources using a load queue as a temporary storage buffer according to one embodiment. System 101, responsive to a load request, determines whether respective cache storage components hold one or more portions (one or more bytes) of a cache line associated with the load request, acquires any portion of the cache line that is found in the respective cache storage components and temporarily stores it in a load queue placeholder corresponding to the load request. Moreover, when through this process, portions of the cache line that are needed to complete the acquisition of the entire cache line have been acquired (and stored in the corresponding load queue placeholder), the associated load can be executed and completed. As such, in a processor with multiple hierarchies of caches and other sources of data from which data may be acquired, a cache line can be collected one or more bytes at a time from one or more of the sources of data. Furthermore, when the acquisition of data that constitutes the entire cache line is completed, the data can be returned back to the pipeline without delaying the load operation until an entire cache line is brought from either main memory or the next level of cache, in order to enable the execution and completion of the load.

FIG. 1A shows system 101, level one (L1) cache 103, store coalescing cache 103a, load cache 103b, cache controller 103c, load queue 103d, store queue 103e, CPU 105, level two (L2) cache 107, store coalescing cache 107a, system interface 109 and main memory 111. In the FIG. 1A embodiment, L1 cache 103 can include store coalescing cache 103a, load cache 103b, cache controller 103c, store queue 103e and load queue 103d.

Referring to FIG. 1A, store queue 103e is a queue of pending store requests. Moreover, in exemplary embodiments, store queue 103e is a source of data from which one or more bytes of data can be acquired as a part of an acquisition of the cache line that is required to enable the execution of a load operation. In addition, in one embodiment, store queue 103e is the first data source (e.g., cache data storage component) that is accessed for bytes of data that are required to enable the execution of a load operation for which a load request has been made.

Level 1 store coalescing cache 103a and level 2 store coalescing cache 107a maintain data that is accessed by store requests. In one embodiment, level 1 store coalescing cache 103a is accessed for bytes of data associated with a load request after the access of store queue 103e. And, level 2 store coalescing cache 107a is accessed for bytes of data associated with load requests after the access of level 1 store coalescing cache 103a and before the access of other parts of L2 cache 107 (which is a secondary cache that is used to store recently accessed data). In one embodiment, level 2 cache 107 is accessed for bytes of data associated with load requests after the access of level 2 store coalescing cache 103a and before the access of main memory 111. In one embodiment, the order in which the cache data storage components are accessed is: (1) store queue 103e at level 1, (2) store coalescing cache 103a at level 1, (3) store coalescing cache 107a at level 2, (3) level 2 cache 107 at level 2 and (4) level 3 cache or main memory 111 at level 3. In other embodiments, other access orders can be used.

Load queue 103d is a queue of the pending load requests that are to be executed by CPU 105. In one embodiment, load queue 103d is used as a temporary storage location for bytes of data corresponding to a load request that are retrieved from respective data sources. In one embodiment, the bytes of data can be deposited in load queue 103d upon their retrieval from the respective sources at different points in time. When the retrieval of the bytes of data is complete, the corresponding load operation can be executed.

Referring to FIG. 1A, system 101, responsive to a load request, accesses, in succession, respective cache data storage components for one or more portions of a cache line, acquires any portion of the cache line found in the respective cache data storage components and temporarily stores acquired data in a load queue. In one embodiment, the cache data storage components are accessed, in a designated order (as discussed above), until the acquisition of the data that is needed to execute the corresponding load is complete.

Figure 1B:
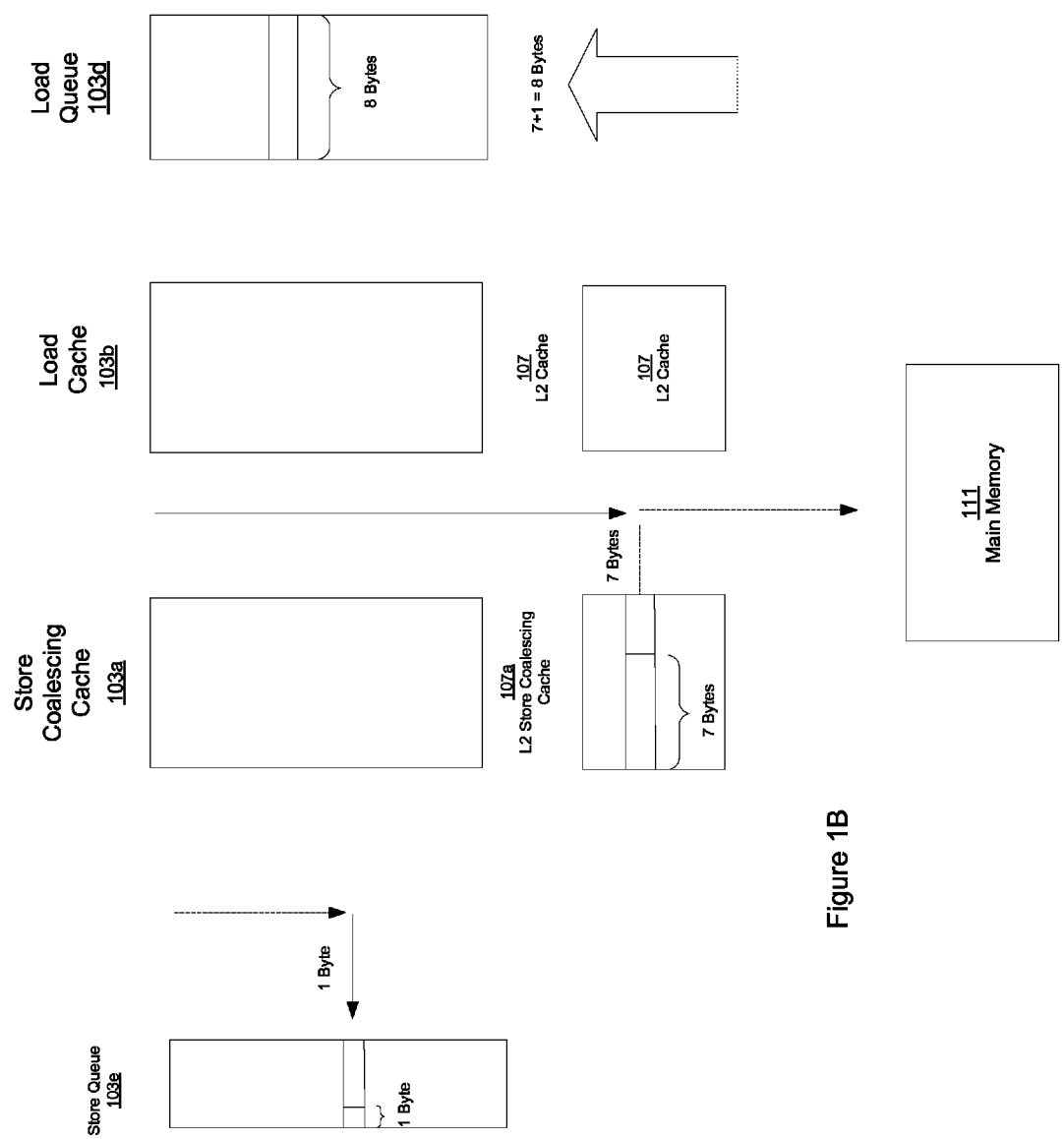
FIG. 1B illustrates an exemplary operation of the system of FIG. 1A, with regard to its accessing of respective cache data storage components in a predetermined order to acquire bytes of data that enable the execution of a load operation.

FIG. 1B illustrates an exemplary operation of system 101, with regard to its accessing of respective cache data storage components in a predetermined order to acquire bytes of data to satisfy a load request. In the FIG. 1B example, the operation of system 101 with regard to a load request involving 8 bytes of data is illustrated. Referring to FIG. 1B, as a part of accessing respective cache data storage components for one or more portions of the 8 bytes of data, system 101 initially accesses store queue 103e at time 0, resulting, as shown in FIG. 1B, in the acquisition of only one of the bytes of data that are required to enable the execution of the corresponding load. The byte that is provided by store queue 103e is deposited into a load queue placeholder that is associated with the load request. System 101 then goes on to access store coalescing cache 107a and L2 cache 107, which both reside at level 2 of the cache hierarchy. In the FIG. 1B example, system 101 acquires the remaining 7 bytes that are required to enable the execution of the corresponding load from its access of store coalescing cache 107a (and its access of L2 cache 107 misses).

As shown in FIG. 1B, the 7 bytes of data that are acquired from store coalescing cache 107a are deposited into the load queue placeholder that is associated with the load. At this point, the acquisition of data responsive to the load request is completed, with the acquisition of data required by the request being satisfied with the respective accesses of store queue 103e and store coalescing cache 107a (as all of the 8 bytes needed to complete the acquisition are obtained thereby). Because the access of the L2 cache 107 missed, in one embodiment, a cache line fetch request is made to level 3 cache or main memory. However, because the needed data, at this point, has already been collected, the pending load operation can be executed, without having to wait for the cache line fetch to complete. In one embodiment, the cache line fetch operation can be converted to a prefetch operation such that the ingress of fresh/new loads into the frontend of the processor (by freeing the load queue placeholder associated with the load) is enabled.

As such, in accordance with exemplary embodiments, the execution of a load operation can be expedited by an early return of data to the pipeline. In particular, a load can be executed, while a cache line fetch request initiated by the load is still pending. In one embodiment, system 101 can be located in a cache controller 103c. In other embodiments, system 101 can be separate from cache controller 103c, but operate cooperatively therewith.

Referring again to FIG. 1A, main memory 111 includes physical addresses that store information that is copied into cache memory. In one embodiment, main memory 111 is accessed for data associated with a load request if accesses of cache data storage components do not result in the acquisition of the data that is needed to fully satisfy the load request. In one embodiment, the version of the data associated with a load request that is acquired from main memory 111 is forwarded directly to load queue 103d. In one embodiment, the version of the data that is forwarded from main memory 111 directly to load queue 111 is merged with portions of a cache line (if any) that have already been acquired from lower level cache data storage components and temporarily stored in load queue 103d. Also shown in FIG. 1A is system interface 109.

Operation

Figure 1C:
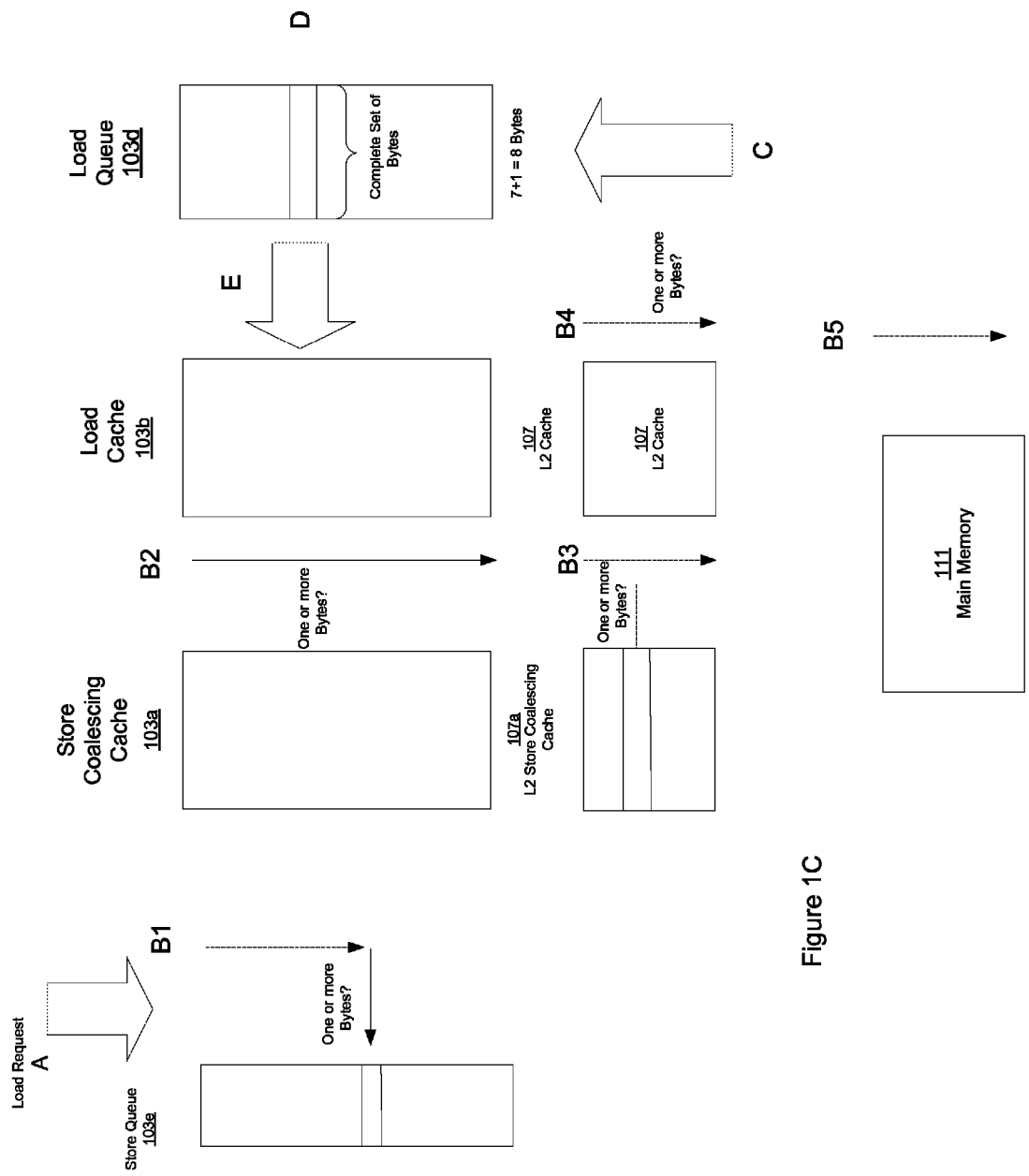
FIG. 1C illustrates operations performed by the system of FIG. 1A, with regard to its accessing of respective cache data storage components in a predetermined order to acquire bytes of data that enable the execution of a load operation.

FIG. 1C illustrate operations performed by system 101 for acquiring data for loads at different times from hierarchical sources using a load queue as a temporary storage buffer according to one embodiment. These operations, which relate to acquiring data for loads, are only exemplary. It should be appreciated that other operations not illustrated by FIG. 1C can be performed in accordance with one embodiment.

Referring to FIG. 1C, at A, as a part of a load access, a load request is received.

At B (e.g., B1-B5), responsive to the load request, system 101 accesses in order (if needed), and at different times, (1) store queue 103e at level 1, (2) store coalescing cache 103a at level 1, (3) store coalescing cache 107a at level 2, (4) level 2 cache 107 at level 2 and (5) level 3 cache or main memory 111 at level 3.

At C, data acquired from accesses of the cache data storage components are temporarily stored in a placeholder of the load queue.

At D, the acquisition of data from the cache data storage components is completed.

At E, the data that is stored in the load queue placeholder is used to execute the requested load operation (load operation is completed).

Figure 2:
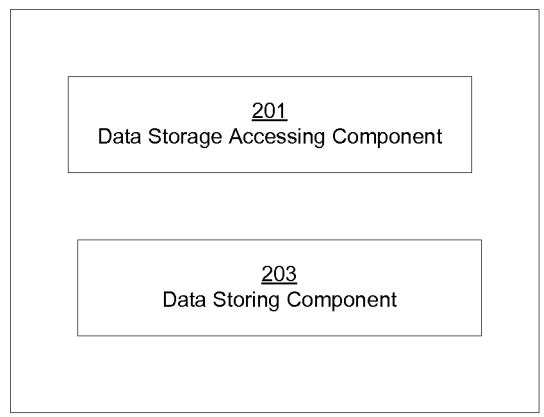
FIG. 2 shows components of a system for acquiring data from hierarchical sources and using a load queue as temporary storage according to one embodiment according to one embodiment.

Components of System for Acquiring Data for Loads at Different Access Times from Hierarchical Sources Using a Load Queue as a Temporary Storage Buffer and Completing the Load Early According to One Embodiment FIG. 2 shows components of a system 101 for acquiring data from hierarchical sources and using a load queue as a temporary data storage buffer according to one embodiment. In one embodiment, components of system 101 implement an algorithm for acquiring data from hierarchical sources at respective times and using a load queue as a temporary storage buffer. In the FIG. 2 embodiment, components of system 101 include data storage accessing component 201 and data storing component 203.

Data storage accessing component 201 accesses cache data storage components, in a designated order, until the acquisition of the data that is sought to be loaded is complete. Initially, data storage accessing component 201 accesses a store queue for one or more portions of a cache line associated with a load. If the store queue does not hold all of the portions of the cache line associated with the load, data storage accessing component 201 accesses in succession, other cache data storage components for the one or more portions of the cache line to complete a collection of all portions of the cache line.

Data storing component 203 stores data that is acquired from accesses of the aforementioned cache data storage components (e.g., by data storage accessing component 201) in the load queue. Upon the acquisition of one or more portions of a cache line from the access of the store queue by data storage accessing component 201, data storing component 203 stores one or more portions of the cache line in a load queue location associated with the load (if the one or more portions of the cache line is held in the store queue). In one embodiment, the load is executed if the one or more portions of the cache line held in the store queue include the entire cache line associated with the load. Upon the acquisition of one or more portions of a cache line from the access of subsequent data storage components by data storage accessing component 201, data storing component 203 stores these portions of the cache line in a load queue location associated with the load. In one embodiment, the load can be executed if a respective cache data storage component of the cache data storage components provides one or more portions of the cache line that completes the acquisition of all portions of the cache line associated with the load (by providing some or all of the required portions of data).

It should be appreciated that the aforementioned components of system 101 can be implemented in hardware or software or in a combination of both. In one embodiment, components and operations of system 101 can be encompassed by components and operations of one or more computer components or programs (e.g., a cache controller 103c). In another embodiment, components and operations of system 101 can be separate from the aforementioned one or more computer components or programs but can operate cooperatively with components and operations thereof.

Figure 3:
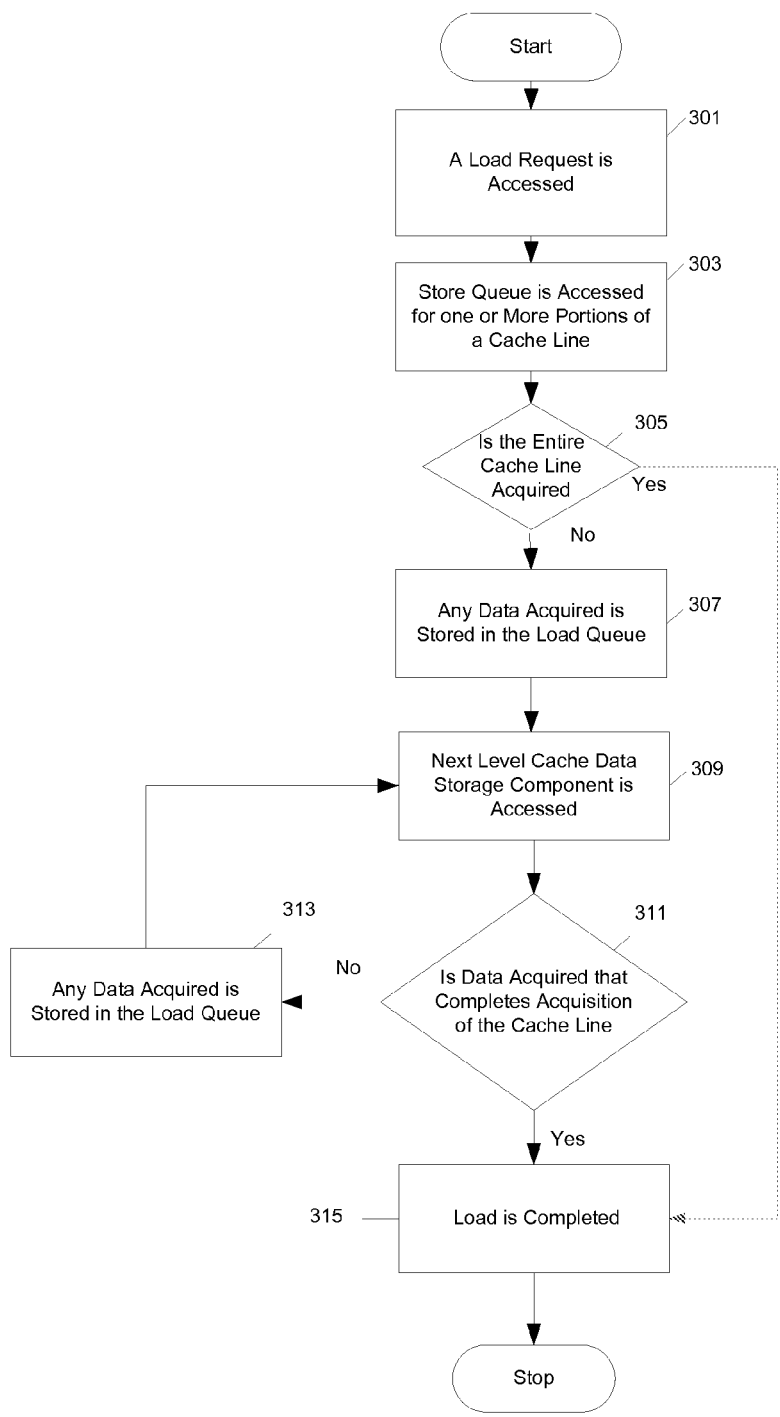
FIG. 3 shows a flowchart of the steps performed in a method for acquiring data from hierarchical sources and using a load queue as temporary storage buffer according to one embodiment.

Method for Acquiring Data for Loads at Different Access Times from Hierarchical Sources Using a Load Queue as a Temporary Storage Buffer According to One Embodiment FIG. 3 shows a flowchart 300 of the steps performed in a method for acquiring data from hierarchical sources and using a load queue as temporary storage buffer according to one embodiment. The flowchart includes processes that, in one embodiment can be carried out by processors and electrical components under the control of computer-readable and computer-executable instructions. Although specific steps are disclosed in the flowcharts, such steps are exemplary. That is the present embodiment is well suited to performing various other steps or variations of the steps recited in the flowchart.

Referring to FIG. 3, at 301, a load request is accessed.

At 303, the store queue is accessed for one or more parts of a cache line associated with the load request.

At 305, it is determined if the entire cache line has been acquired from the access of the store queue. If the entire cache line has been acquired control passes to 315 (and the load is completed). If the entire cache line has not been acquired control passes to 307.

At 307, any data acquired from the access of the store queue is temporarily stored in the load queue.

At 309, the next level cache data storage component is accessed.

At 311, it is determined if data is acquired from the access of the next level cache data storage component that completes the acquisition of the cache line. If data that completes the acquisition of the cache line is acquired then control passes to 315 (and the load is completed). If data that completes the acquisition of the cache line is not acquired, then control passes to 313.

At 313, any data that is acquired from the access of the next level cache data storage component at 309 is stored in the load queue. Then, control is returned to 309 where the next level cache data storage component is accessed.

At 315, the load operation is completed using the acquired data that is stored in the load queue placeholder that is associated with the load.

With regard to exemplary embodiments thereof, systems and methods for acquiring data associated with a load from respective hierarchical cache data storage components. As a part of the method, a store queue is accessed for one or more portions of a cache line associated with a load, and, if the one or more portions of the cache line is held in the store queue, the one or more portions of the cache line is stored in a load queue location associated with the load. The load is completed if the one or more portions of the cache line stored in the load queue location includes all portions of the cache line associated with the load. If the store queue does not hold all of the portions of the cache line associated with the load, respective cache data storage components are accessed, in succession, for the one or more portions of the cache line associated with the load. If the one or more portions of the cache line is held in one or more cache data storage components of the respective cache data storage components, the one or more portions of the cache line is stored in the load queue location associated with the load. The load is completed if the one or more cache data storage components of the respective cache data storage components provides the one or more portions of the cache line, for storage in the load queue location, and the provision of the one or more portions, completes an acquisition of all portions of the cache line that is associated with the load.

Although many of the components and processes are described above in the singular for convenience, it will be appreciated by one of skill in the art that multiple components and repeated processes can also be used to practice the techniques of the present invention. Further, while the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of components and should not be restricted to the ones mentioned above. It is therefore intended that the invention be interpreted to include all variations and equivalents that fall within the true spirit and scope of the present invention.

We claim:

1. A method for acquiring data associated with a load from respective hierarchical cache data storage components, the method comprising:

accessing a store queue for one or more portions of a cache line associated with a load, and, if said one or more portions of said cache line is held in said store queue, storing said one or more portions of said cache line in a load queue location associated with said load, wherein said load is completed if said one or more portions of said cache line stored in said load queue location comprises all portions of said cache line associated with said load, and wherein said load queue is operable to temporarily store one or more bytes of data corresponding to a load request retrieved from respective data sources, and wherein the one or more bytes of data are operable to be deposited in said load queue upon their retrieval from the respective data sources at different times; and if said store queue does not hold all of the portions of said cache line associated with said load, accessing, in succession, respective cache data storage components, for said one or more portions of said cache line associated with said load, and, if said one or more portions of said cache line is held in one or more cache data storage components of said respective cache data storage components, storing said one or more portions of said cache line in said load queue location associated with said load, wherein said load is completed if said one or more of said respective cache data storage components of said cache data storage components provides said one or more portions of said cache line, for storage in said load queue location, to complete an acquisition of all portions of said cache line associated with said load, wherein said cache data storage components comprise a level 1 store coalescing cache, a level 2 store coalescing cache, and a level 2 cache, and wherein the level 1 store coalescing cache is accessed for one or more portions of said cache line associated with said load after the access of the store queue.

2. The method of claim 1 wherein said store queue is accessed at a different time than other level 1 and level 2 components.

3. The method of claim 1 wherein data is provided to an instruction pipeline before a version of said cache line is brought from main memory.

4. The method of claim 1 wherein said load completes while a cache line fetch request initiated by the load is still pending.

5. The method claim 1 wherein said one or more portions of a cache line comprise one or more bytes of data.

6. The method of claim 1, further comprising converting a cache line fetch operation to a prefetch operation.

7. A cache system, comprising:
a level two cache; and
a level one cache comprising:
a load queue; and
a cache controller, the cache controller comprising:
a data storage accessing component operable to access cache data storage components for one or more portions of a cache line in a designated order, until the acquisition of said cache line for loading is complete; and
a data storing component operable to store data that is acquired from accesses of the cache data storage components in the load queue, and wherein said load queue is operable to temporarily store one or more bytes of data corresponding to a load request retrieved from respective data sources, and wherein further said one or more bytes of data are operable to be deposited in said load queue upon thereof retrieval from said respective data sources at different times, wherein said cache data storage components comprise a level 1 store coalescing cache, a level 2 store coalescing cache, and a level 2 cache, and wherein the level 1 store coalescing cache is accessed for one or more portions of said cache line associated with said load request after the access of the store queue.

8. The cache system of claim 7 wherein said data storage components are each accessed at a different time.

9. The cache system of claim 7 wherein data is provided to an instruction pipeline before a version of said cache line is brought from main memory.

10. The cache system of claim 7 wherein said load completes while a cache line fetch request initiated by the load is still pending.

11. The cache system of claim 7 wherein said one or more portions of a cache line comprise one or more bytes of data.

12. The cache system of claim 7 wherein a cache line fetch operation is converted to a prefetch operation.

13. A processor, comprising:
a central processing unit (CPU); and
a cache system, comprising:
a level two cache system; and
a level one cache system comprising:
a load queue; and
a cache controller comprising:
a data storage accessing component operable to access cache data storage components for one or more portions of a cache line to be loaded in a designated order, until the acquisition of said cache line that is to be loaded is complete; and
a data storing component operable to store data that is acquired from accesses of the cache data storage components in the load queue, and wherein said load queue is operable to temporarily store one or more bytes of data corresponding to a load request retrieved from respective data sources, and wherein said one or more bytes of data are operable to be deposited in said load queue upon retrieval thereof from said respective data sources at different times, wherein said cache data storage components comprise a level 1 store coalescing cache, a level 2 store coalescing cache, and a level 2 cache, and wherein the level 1 store coalescing cache is accessed for one or more portions of said cache line associated with said load request after the access of the store queue.

14. The system of claim 13 wherein said data storage components are each accessed at a different time.

15. The system of claim 13 wherein data is provided to an instruction pipeline before a whole version of said cache line is brought from main memory.

16. The system of claim 13 wherein said load completes while a cache line fetch request initiated by the load is still pending.

17. The system of claim 13 wherein said one or more portions comprise one or more bytes of data.

18. The system of claim 15, wherein said whole version of said cache line brought in from main memory is forwarded directly to said load queue.

* * * * *